US008943424B2

(12) United States Patent
Mendel et al.

(10) Patent No.: US 8,943,424 B2
(45) Date of Patent: Jan. 27, 2015

(54) DYNAMIC INTERFACE COMPONENT CONTROL SUPPORT

(75) Inventors: Gili Mendel, Cary, NC (US); Brendan Murray, Monasterboice (IE); Jeffrey D. Myers, Durham, NC (US); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/569,577

(22) Filed: Aug. 8, 2012

(65) Prior Publication Data

US 2012/0311468 A1 Dec. 6, 2012

Related U.S. Application Data

(63) Continuation of application No. 11/177,100, filed on Jul. 8, 2005, now Pat. No. 8,341,536.

(51) Int. Cl.
  *G06F 3/00* (2006.01)
  *G06F 9/44* (2006.01)
(52) U.S. Cl.
  CPC ... *G06F 8/38* (2013.01); *G06F 8/31* (2013.01)
  USPC .......................................................... 715/762
(58) Field of Classification Search
  USPC .................................. 715/762, 763, 764, 765
  See application file for complete search history.

(56) References Cited

U.S. PATENT DOCUMENTS

| 6,374,308 | B1 | 4/2002 | Kempf et al. |
| 6,469,714 | B2 | 10/2002 | Buxton et al. |
| 6,757,900 | B1 | 6/2004 | Burd et al. |
| 6,788,315 | B1 | 9/2004 | Kekic et al. |
| 6,792,607 | B1 | 9/2004 | Burd et al. |
| 2001/0009033 | A1 | 7/2001 | Morisaki et al. |
| 2003/0071842 | A1 | 4/2003 | King et al. |
| 2003/0074090 | A1 | 4/2003 | Becka et al. |
| 2003/0167330 | A1 | 9/2003 | Cohen et al. |

FOREIGN PATENT DOCUMENTS

| EP | 158415 A2 | 11/2001 |
| WO | 02054171 A2 | 7/2002 |

*Primary Examiner* — Rashawn Tillery
(74) *Attorney, Agent, or Firm* — Cuenot, Forsythe & Kim, LLC

(57) ABSTRACT

A system, computer program and method for developing a graphical user interface (GUI) in a computer program. The invention allows developers to control the properties of interface components according to the state of a program during execution. According to the invention, a GUI development environment may be configured to provide a GUI builder for creating the GUI, display an interface component with at least one interface component property to be instantiated in the GUI, display a property interface to input at least one value for the interface component property in response to an event detectable by the computer program during GUI program execution, and automatically generate GUI program code effectuating the value for the interface component property in response to the event detectable by the computer program during GUI program execution.

18 Claims, 4 Drawing Sheets

DYNAMIC INTERFACE COMPONENT CONTROL SUPPORT

CROSS-REFERENCE TO RELATED APPLICATIONS

This application is a Continuation of U.S. application Ser. No. 11/177,100, filed on Jul. 8, 2005.

FIELD OF THE INVENTION

The present invention relates generally to computer programs, and more specifically to Graphical User Interface (GUI) development.

BACKGROUND

Graphical User Interfaces (GUIs) have become commonplace in computer programs. In general, a GUI is the graphical control panel with which a user interacts with a computer program. A modern GUI can include buttons, labels, text boxes, slide bars, check boxes, progress bars, menus, and other interface components or "widgets". GUIs help users efficiently perform complex operations without having to remember complex line commands for computer programs.

GUIs are typically event driven, meaning the computer program implementing the GUI "listens" for events that the GUI must process. Frequently, events captured by the GUI cause the displayed widgets to change. For example, a mouse button release event may cause a displayed button to change from an activated image to a deactivated image.

There have been many computer programs written to help simplify the task of creating GUIs. For example, numerous Integrated Development Environment (IDE) programs allow GUI developers to drag and drop various widgets onto a GUI development pallet. These IDEs often create method stubs from handling various events that the programmer many desire to act upon.

SUMMARY OF THE INVENTION

One exemplary aspect of the present invention is a method for developing a GUI in a computer program. The method includes providing a GUI builder for creating the GUI. A displaying operation displays an interface component configured to be instantiated in the GUI. The interface component includes at least one interface component property. Another displaying operation displays a property interface configured to input at least one value for the interface component property in response to an event detectable by the computer program during program execution. A generating operation automatically generates program code effectuating the value for the interface component property in response to the event detectable by the computer program during program execution.

Another exemplary aspect of the present invention is a system for developing a GUI in a computer program. The system includes a GUI development environment for creating the GUI. An interface component, including at least one interface component property, is configured to be instantiated in the GUI. A property interface is configured to input at least one value for the interface component property in response to an event detectable by the computer program during program execution. A program code generator is configured to automatically generate program code effectuating the value for the interface component property in response to the event detectable by the computer program during program execution.

Yet a further exemplary aspect of the invention is a computer program product embodied in a tangible media. The computer program product includes computer readable program codes configured to cause the program to provide a GUI builder for creating the GUI, display an interface component with at least one interface component property to be instantiated in the GUI, display a property interface to input at least one value for the interface component property in response to an event detectable by the computer program during GUI program execution, and automatically generate GUI program code effectuating the value for the interface component property in response to the event detectable by the computer program during GUI program execution.

DETAILED DESCRIPTION OF THE INVENTION

Figure 1:
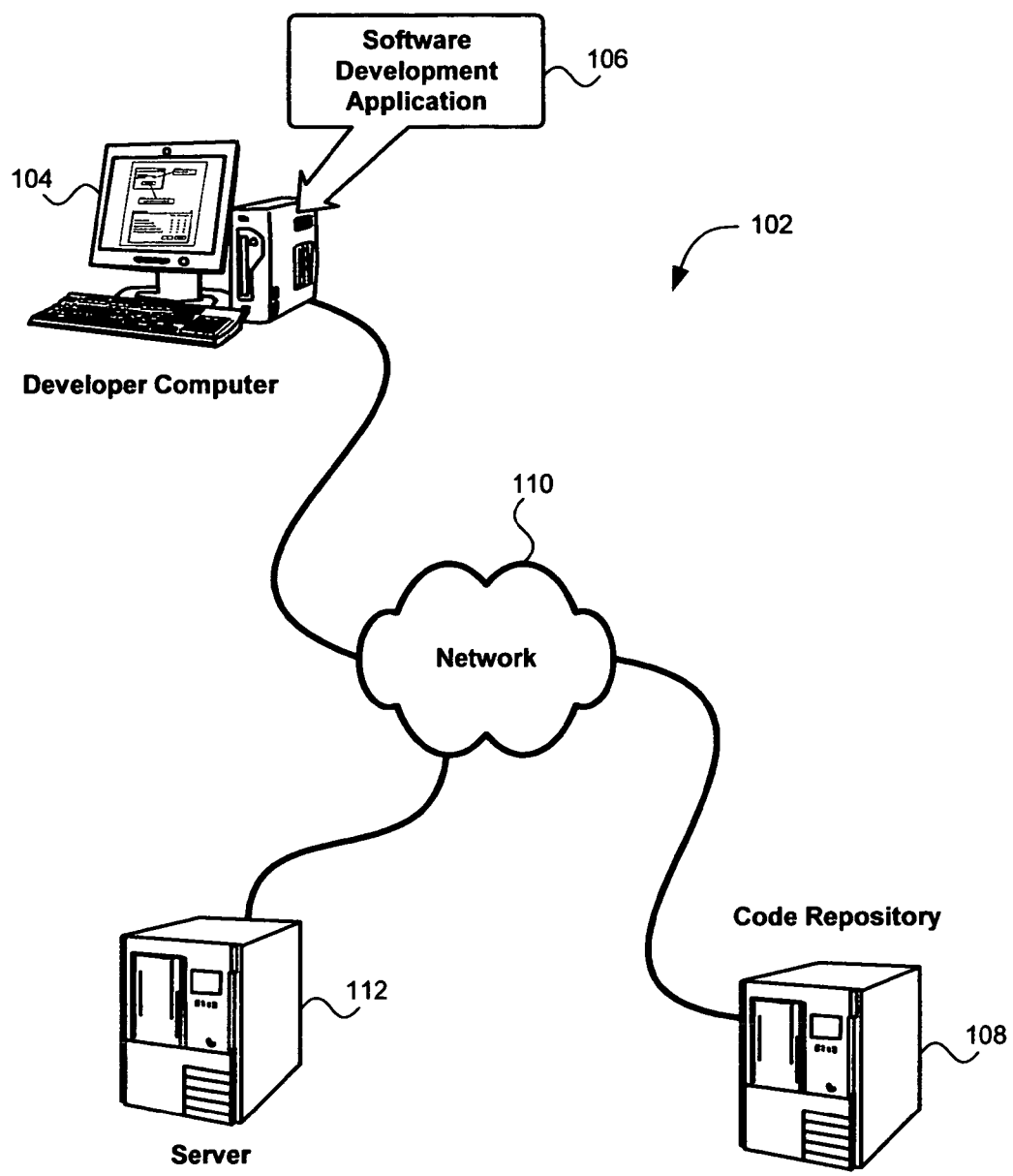
FIG. 1 shows one configuration of an exemplary environment embodying the present invention.

The following description details how the present invention is employed to enhance development of graphical user interfaces (GUIs) in software programs. Throughout the description of the invention reference is made to FIGS. 1-4. When referring to the figures, like structures and elements shown throughout are indicated with like reference numerals.

FIG. 1 shows an exemplary environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein.

The environment 102 includes a developer computer 104 containing a software development application 106. The software development application 106 can assist a program developer to produce a computer software product. In other words, the software development application 106 is a computer program to help create other computer programs. The software development application 106 can include a code editor, a compiler, a debugger and/or a simulator. Some software development applications 106 are referred to as Integrated Development Environments (IDEs). In a particular embodiment of the present invention, the Eclipse IDE platform from the Eclipse Foundation is used as the software development application 106. It is contemplated, however, that various software development applications 106 may be utilized in the environment 102 without departing from the scope and spirit of the present invention.

As described in detail below, the software development application 106 includes a GUI development environment for creating GUIs. In accordance with the present invention, the GUI development environment allows the developer to specify state changes to an instantiated interface component in response to changes at an instantiated data object.

The environment 102 may also include a code repository 108 coupled to the developer computer 104 via a computer network 110. The code repository 108 may include source files and binary files of software under development. In one embodiment of the invention, the code repository 108 is managed using a version control system. The version control system allows developers to keep track of changes to software under development.

The environment 102 may further include a server 112 coupled to the developer computer 104 via a computer network 110. The server 112 provides resources bound to the program under development at the developer computer 104. For example, the server 112 may be a song server that stores a catalog of digital songs, maintains user accounts, and generally interacts with the program under development at the developer computer 104. Generally speaking, the server 112 can be a service-based server performing various business operations and logic, such as a data server, a web server, transactional server, or a data repository.

The computer network 110 may be a Local Area Network (LAN), a Wide Area Network (WAN), or a combination thereof. It is contemplated that the computer network 110 may be configured as a public network, such as the Internet, and/or a private network, such as an Intranet, and may include various topologies and protocols known to those skilled in the art, such TCP/IP and UDP. Furthermore, the computer network 110 may include various networking devices known to those skilled in the art, such as routers, switches, bridges, repeaters, etc.

Figure 2:
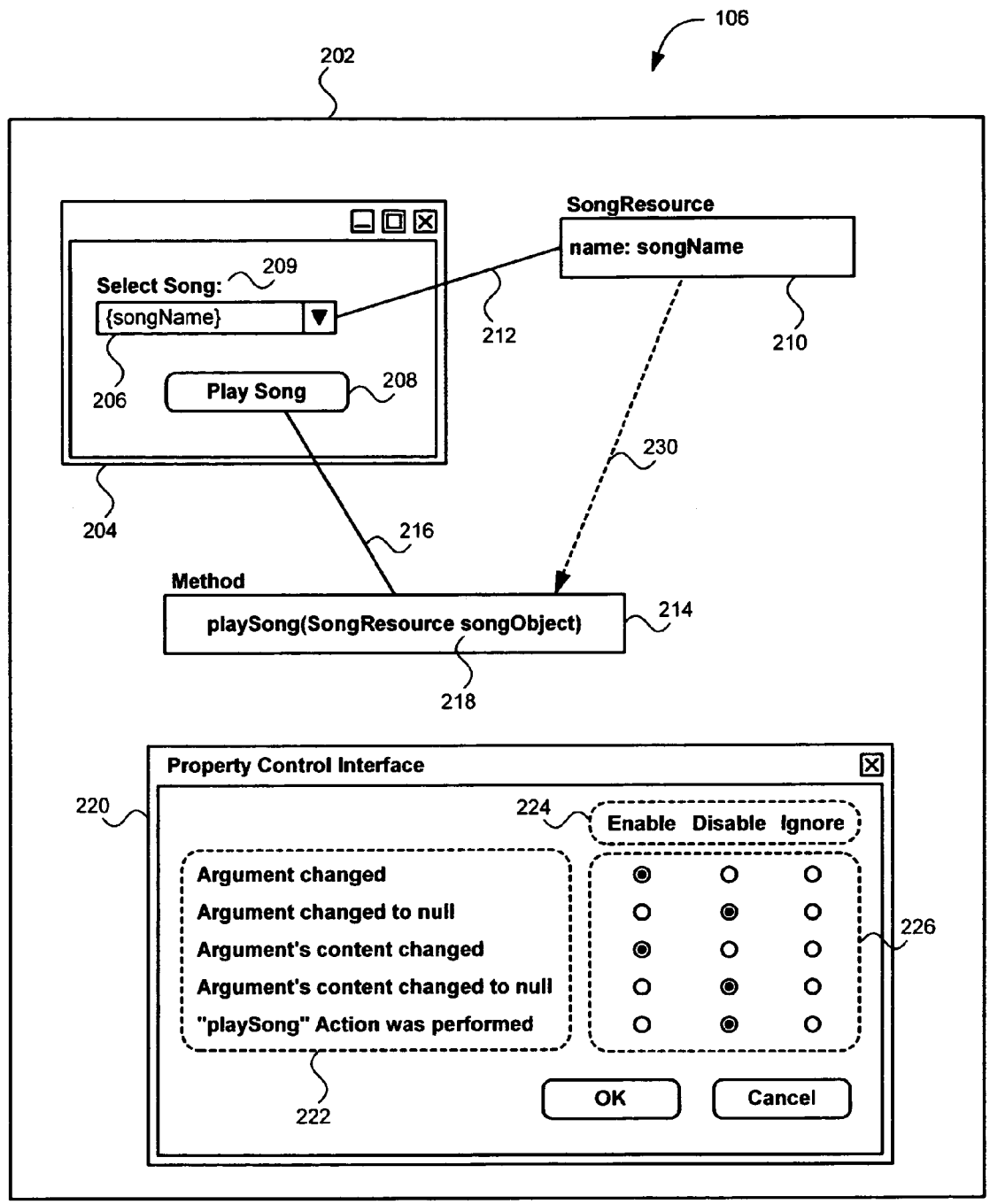
FIG. 2 shows software development application as contemplated by the present invention.

Turning now to FIG. 2, an embodiment of the software development application 106, as contemplated by the present invention, is shown in more detail. The software development application 106 allows developers to construct a GUI with minimal manual coding. Minimizing manual coding helps reduce programming errors and development time.

The software development application 106 includes a GUI builder 202 for creating a GUI. In one embodiment, the GUI builder 202 is a graphical tool for developing graphical interfaces. For example, the GUI builder 202 may include a WYSIWYG editor allowing developers to see what the GUI will look like at runtime. The GUI builder 202 can also graphically manipulate elements of the interface under development. Some of the operations that the GUI builder 202 may support include, but are not limited to, drag-and-drop, resizing, alignment, widget selection, widget binding, and pallet selection of GUI components.

GUI builder 202 allows the developer to create an application frame 204. The application frame 204 is typically an area of the display that the program user interacts with at program runtime. Using the GUI builder 202, the developer can populate the application frame 204 with interface components 206, 208, such as widgets, graphics, text 209 and other interface objects.

Each interface component 206, 208 can include properties that can be modified during the program's execution. For example, the "Play Song" button widget 208 includes properties such as background color, text font, activation (whether the button is clickable), visibility, etc. It is contemplated that different types of interface components 206, 208 can have different properties.

The GUI builder 202 can visually create bindings between interface components 206, 208 and resources coupled to the GUI without writing computer code. Generally, bindings create a link between an interface component and a resource such that changes at the resource are reflected at the interface component. A resource is a source of information or data. For instance, a resource can be a database or a web service. The GUI builder 202 automatically generates source code that creates the binding for the developer. The source code is made available to the developer for inspection and/or modification, if needed. It is contemplated that the GUI builder 202 can generate source code in various object oriented and non-object oriented programming languages, including Java, C/C++, Smalltalk, and Tcl.

To create a binding, a resource representation 210 is bound to the GUI builder 202. The developer further specifies binding 212 by interactively indicating that one or more properties of the interface component 206, 208 are to be bound to the resource. For example, in FIG. 2, the text property of the dropdown text box widget 206 is bound to the name field of the resource representation 210. It should be noted that the resource value(s) in the resource representation 210 may be manipulated by various other portion/bindings of the program. It is contemplated that the developer can indicate creation of a binding by mouse movement, mouse click, keyboard command, menu option selection, gestures or other known interactive techniques.

The GUI builder 202 can also bind interface components 206, 208 to methods (actions) 214. For example, a method binding 216 is shown in FIG. 2 between the "Play Song" button widget 208 and the "playSong" method 214. When a user clicks the Play Song button 208 at runtime, the playSong method is invoked and is expected to play the song specified by the method argument 218.

A developer may wish to change one or more properties of an interface component 206, 208 in response to changes to the instantiated resource. For example, a developer may desire that the Play Song button be active only when a new valid song is selected at the dropdown text box 206. In conventional IDEs, a developer would typically have to manually create program code that listen to events and changes the Play Song button's activation property to be active only when a new valid song is selected. Also, it may be required that once the play button is pressed, the button is to be deactivated. As described below, the present invention helps configure the system and create/update program code that changes an instantiated interface component's properties in response to changes at an instantiated resource.

According to one embodiment of the invention, a property interface 220 may be invoked by a developer when creating bindings 212, 216. The property interface 220 is configured to input at least one value for the interface component property in response to an event detectable by the computer program during program execution. Once the relationships between property values and the program events are specified at the property interface 220, the software development application 106 automatically generates program code effectuating the value for the interface component property in response to the event detectable by the computer program during program execution. In other words, the property interface 220 includes a set of rules that are acted upon based on dependencies to bindings.

The property interface 220 is divided into three sections: an event section 222, a property section 224 and a value section 226. The event section 222 is configured to list at least one detectable event by the computer program during program execution. The property section 224 is configured to list at least one property of the interface component under development. The value section 226 is configured to input from the developer a property value to be assigned to the interface component under development when the event specified in the event section 222 is detected.

For example, the developer may wish to disable the "Play Song" button 208 if no song is selected in the dropdown text box widget 206. The achieve this behavior, the value section 226 of the property interface 220 is set to "disable" when, in the event section 224, the selected song is equal to null. The property control interface 220 therefore acts upon the argument binding 230 dependency created between the resource 210 and the method 214. It should be noted that there may be several arguments and argument bindings acted upon by the property control interface 220.

In one embodiment of the invention, the software development application 106 creates method wrappers around methods 214 bound to interface components 206, 208. Generally, a wrapper is additional program code designed to provide additional functionality to a resource. In this case, the wrappers created by the software development application 106 may monitor invocation of methods, method results and the arguments passed to methods. The actions detected by the method wrappers are broadcast in the program as events. Thus, event listeners may utilize method wrappers to change interface component properties in response to method events detectable by the computer program during program execution.

For example, the "Play Song" button 208 is shown bound to the playSong method 214. The playSong method 214 receives a songObject argument 218 of the type Resource. A wrapper automatically generated by the software development application 106 is utilized by the event section 222 of the property interface 222 to control the properties of the "Play Song" button 208 during program execution.

Figure 3:
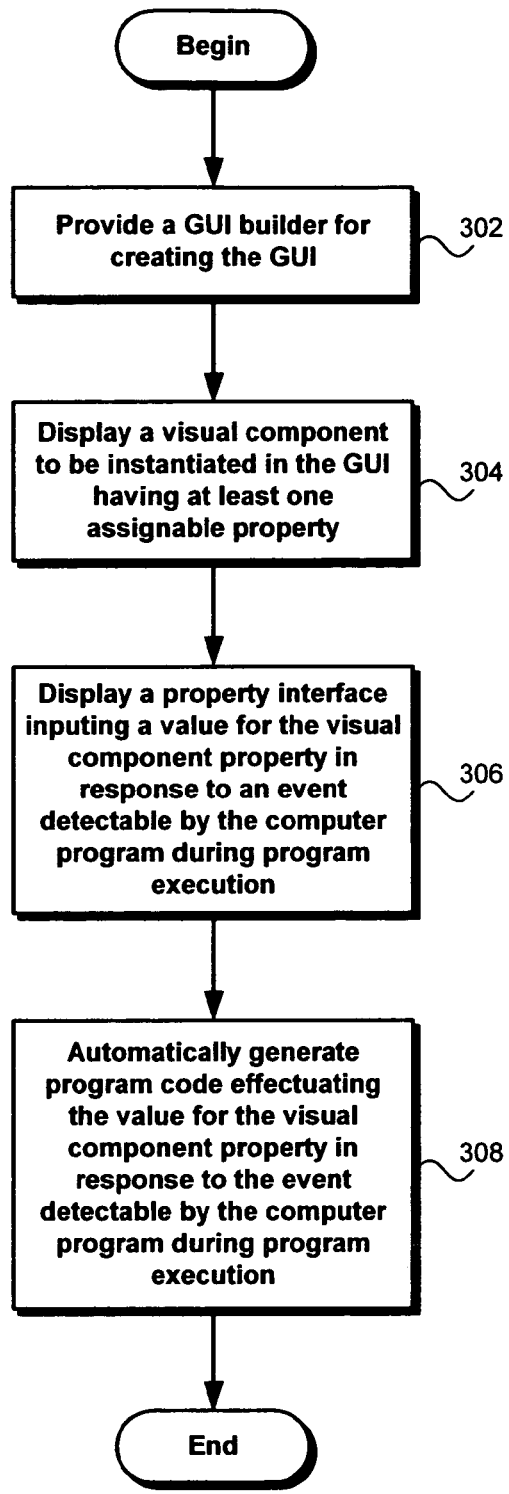
FIG. 3 shows a flowchart of system operations performed by one embodiment of the present invention.

In FIG. 3, a flowchart of system operations performed by one embodiment of the present invention is shown. It should be remarked that the logical operations shown may be implemented in hardware or software, or a combination of both. The implementation is a matter of choice dependent on the performance requirements of the system implementing the invention. Accordingly, the logical operations making up the embodiments of the present invention described herein are referred to alternatively as operations, steps, or modules.

Operational flow begins with providing operation 302. During this operation, a GUI builder for creating the GUI is provided to the developer. As mentioned above, the GUI builder can be a component of an integrated development environment for creating computer programs. Examples of integrated development environments include the Eclipse IDE platform and Microsoft's Visual Studio®. Visual Studio is a registered trademark of Microsoft Corporation, located in Redmond, Wash., USA. The GUI builder may be used to create GUIs for various applications, including real-time systems and general-purpose processors. After the GUI builder is provided, control passes to displaying operation 304.

At displaying operation 304, one or more interface components are displayed at the GUI builder. The displaying operation 304 also displays existing instantiated components for modification. The interface components are configured to be instantiated in the GUI under development, and typically include at least one property value assignable at runtime. It is contemplated that a toolbar or screen window may be present at the GUI builder allowing the developer to select a desired interface component from a catalog of various interface components. Displaying operation 304 may include various interface component arrangement operations, such as drag-and-drop, alignment and resize operations. After displaying operation 304 is completed, control passes to displaying operation 306.

At displaying operation 306, a property interface is presented to the developer. The property interface is configured to input at least one value for the interface component property in response to an event detectable by the computer program during program execution. As mentioned above, the property interface may include an event section configured to list at least one event detectable by the computer program during program execution, a property section configured to list at least one property of the interface component, and a value section configured to input a property value assigned to the property listed in the property section when the event listed in the event section is detected. Examples of interface component properties include, but are not limited to, activation, visibility, color, font and icon of the instantiated interface component. Once displaying operation 306 is completed, control passes to generating operation 308.

At generating operation 308, program code effectuating the value for the interface component property in response to the event detectable by the computer program during program execution is automatically generated and/or updated. Generating operation 308 may also include the operation of automatically generating and/or updating a method wrapper configured to produce events based on an invocation of at least one method bound to the interface component.

After the program code is generated, it can be visualized, modified, debugged and/or simulated at the software development application, as discussed above. It is contemplated that various programming languages may be used by the present invention to generate the program code. For example, the programming language may be Java, C/C++, Smalltalk, and Tcl. Once generating operation 308 is completed, the process flow is completed.

Figure 4:
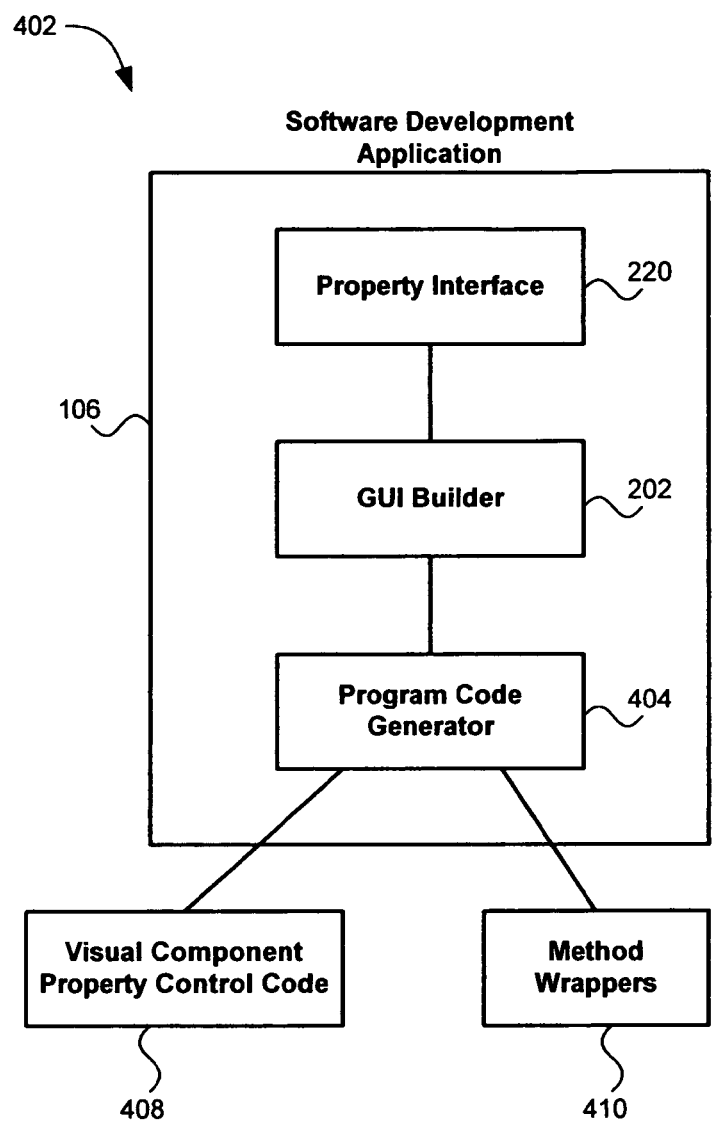
FIG. 4 shows another embodiment of a software development application for developing a software application as contemplated by one embodiment of the present invention.

Turning now to FIG. 4, a software development application 106 for developing a software application, as contemplated by one embodiment of the present invention, is shown. The software development application 106 may be embodied in various tangible media know in the art, including, but not limited to, read only memory, random access memory, data streams, optical and magnetic memory, and the like. As discussed above, the software development application 106 is a software development tool that can incorporate a code editor, a compiler, a debugger and/or a simulator.

In accordance with the present invention, the software development application 106 includes a GUI builder 202 coupled to a property interface 220 and a program code generator 402. The GUI builder 202 is an interface for developing GUIs. It can be used to graphically manipulate interface components, allowing a developer to select and manipulate GUI widgets.

The property interface 220 is configured to input at least one value for an interface component property in response to an event detectable by a computer program during program execution. The property interface 220 enables a data source binding to specify a dynamic action. For example, the button widget can be configured to activate/deactivate depending on modifications to an object in a bound method's argument.

The program code generator 404 is configured to automatically generate and/or update visual property control code 408 to effectuate the value for an interface component property in response to an event detectable by the computer program during program execution. Furthermore, the program code generator 404 produces and/or updates method wrappers 410. As mentioned above, the wrappers created by the code generator 404 may monitor invocation of methods, method results and the arguments passed to methods. Event listeners may utilize method wrappers to change interface component properties in response to method events detectable by the computer program during program execution.

The dynamic interaction of components requires significant custom code to be written to activate, disable, hide and refresh various interface components, depending on the specific input stimuli from user interaction and data sources. Any change to any data object, or any action on an interface component is propagated through related binding objects. For example, clicking on a button would invoke an action that notifies all dependent objects. The code generator 404 provides this functionality without the developer needing to write custom event code. This is very powerful in the sense that a designer can create a Create/Read/Update/Delete application with a few clicks, having runtime interactions between components that would otherwise require many lines of code by a seasoned programmer.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for developing a graphical user interface (GUI) having an interface component including an interface component property, comprising:
   displaying a property interface including an event section and a value section;
   receiving, using the property interface, a value for the interface component property; and
   automatically generating program code effectuating the value for the interface component property in response to an event detectable, during program execution, by a computer program implementing the GUI, wherein
   the event section is configured to list a plurality of events associated with the interface component and detectable by the computer program implementing the GUI, and
   the value section is configured a receive, as in input, values associated, respectively, with the plurality of events.

2. The method of claim 1, wherein
   the property interfaces further includes a property section, and
   the property section is configured to list the interface component property.

3. The method of claim 1, wherein
   the automatically generating the program code includes automatically generating a method wrapper configured to produce events based upon an invocation of at least one method bound to the interface component.

4. The method of claim 1, further comprising
   displaying a resource indicia representing a instantiated resource coupled to the GUI.

5. The method of claim 4, wherein
   the instantiated resource is an argument to a method bound to the instantiated interface component.

6. The method of claim 4, wherein
   the instantiated resource is a dependency to a method bound to the instantiated interface component.

7. A computer hardware system configured to develop a graphical user interface (GUI) having an interface component including an interface component property, comprising:
   at least one processor, wherein the at least one processor is configured to initiate and/or perform:
      displaying a property interface including an event section and a value section;
      receiving, using the property interface, a value for the interface component property; and
      automatically generating program code effectuating the value for the interface component property in response to an event detectable, during program execution, by a computer program implementing the GUI, wherein
   the event section is configured to list a plurality of events associated with the interface component and detectable by the computer program implementing the GUI, and
   the value section is configured a receive, as in input, values associated, respectively, with the plurality of events.

8. The system of claim 7, wherein
   the property interfaces further includes a property section, and
   the property section is configured to list the interface component property.

9. The system of claim 7, wherein
   the automatically generating the program code includes automatically generating a method wrapper configured to produce events based upon an invocation of at least one method bound to the interface component.

10. The system of claim 7, wherein the at least one processor is further configured to initiate and/or perform
    displaying a resource indicia representing a instantiated resource coupled to the GUI.

11. The system of claim 10, wherein
    the instantiated resource is an argument to a method bound to the instantiated interface component.

12. The system of claim 10, wherein
    the instantiated resource is a dependency to a method bound to the instantiated interface component.

13. A computer program product, comprising:
    a computer usable storage medium having stored therein computer usable program code for developing a graphical user interface (GUI) having an interface component including an interface component property, the computer usable program code, which when executed by a computer hardware system, causes the computer hardware system to perform:
       displaying a property interface including an event section and a value section;
       receiving, using the property interface, a value for the interface component property; and
       automatically generating program code effectuating the value for the interface component property in response to an event detectable, during program execution, by a computer program implementing the GUI, wherein
    the event section is configured to list a plurality of events associated with the interface component and detectable by the computer program implementing the GUI, and
    the value section is configured a receive, as in input, values associated, respectively, with the plurality of events, wherein the computer usable storage medium is not a transitory propagating signal per se.

14. The computer program product of claim 7, wherein
    the property interfaces further includes a property section, and
    the property section is configured to list the interface component property.

15. The computer program product of claim 13, wherein
    the automatically generating the program code includes automatically generating a method wrapper configured to produce events based upon an invocation of at least one method bound to the interface component.

16. The computer program product of claim 13, wherein the computer usable program code further causes the computer hardware system to perform:
   displaying a resource indicia representing a instantiated resource coupled to the GUI.

17. The computer program product of claim 16, wherein the instantiated resource is an argument to a method bound to the instantiated interface component.

18. The computer program product of claim 16, wherein the instantiated resource is a dependency to a method bound to the instantiated interface component.

* * * * *